US008289851B2

United States Patent
Lakshman et al.

(10) Patent No.: US 8,289,851 B2
(45) Date of Patent: Oct. 16, 2012

(54) LIGHTWEIGHT BANDWIDTH-MANAGEMENT SCHEME FOR ELASTIC TRAFFIC

(75) Inventors: Tirunell V. Lakshman, Morganville, NJ (US); Ravi S. Prasad, Atlanta, GA (US); Marina K. Thottan, Westfield, NJ (US)

(73) Assignee: Alcatel Lucent, Paris (FR)

( * ) Notice: Subject to any disclaimer, the term of this patent is extended or adjusted under 35 U.S.C. 154(b) by 1098 days.

(21) Appl. No.: 11/799,036

(22) Filed: Apr. 30, 2007

(65) Prior Publication Data

US 2008/0267068 A1    Oct. 30, 2008

(51) Int. Cl.
*H04L 12/26* (2006.01)
(52) U.S. Cl. ....................................... 370/235
(58) Field of Classification Search .................. 709/102; 370/392, 413, 229, 401, 235; 455/453
See application file for complete search history.

(56) References Cited

U.S. PATENT DOCUMENTS

| | | | | |
|---|---|---|---|---|
| 6,560,198 B1* | 5/2003 | Ott et al. | ........................ | 370/235 |
| 6,768,739 B1* | 7/2004 | Kobayashi et al. | ............ | 370/392 |
| 7,436,845 B1* | 10/2008 | Rygh et al. | ..................... | 370/413 |
| 2002/0188648 A1 | 12/2002 | Aweya et al. | ................. | 709/102 |
| 2003/0142623 A1* | 7/2003 | Bernhard et al. | ............. | 370/229 |
| 2006/0189322 A1* | 8/2006 | Conte et al. | ..................... | 455/453 |
| 2007/0280245 A1* | 12/2007 | Rosberg | ....................... | 370/392 |
| 2008/0240125 A1* | 10/2008 | Purvis et al. | .................. | 370/401 |

FOREIGN PATENT DOCUMENTS

WO    WO 2004/084508 A1    9/2004

* cited by examiner

*Primary Examiner* — Anh-Vu Ly
*Assistant Examiner* — Gbemileke Onamuti
(74) *Attorney, Agent, or Firm* — Mendelsohn, Drucker & Associates, P.C.; Kevin M. Drucker; Steve Mendelsohn

(57) ABSTRACT

A lightweight probabilistic mechanism used to estimate the number of active flows, which estimate is used to determine the probability of admitting a new flow into the network. In one embodiment, a method for controlling admission of new flows at a node in a network of nodes interconnected by links includes: (a) for each of a plurality of incoming packets arriving at the node, each incoming packet corresponding to an active flow traversing the node: (a1) randomly selecting a packet from an output buffer of the node; (a2) determining whether the incoming packet is from the same active flow as the randomly-selected packet; and (a3) updating an estimate of the number of active flows traversing the node based on the determination of step (a2); and (b) determining whether to admit or drop part or all of a new flow at the node based on the estimated number of active flows traversing the node.

16 Claims, 14 Drawing Sheets

LIGHTWEIGHT BANDWIDTH-MANAGEMENT SCHEME FOR ELASTIC TRAFFIC

BACKGROUND OF THE INVENTION

1. Field of the Invention

The present invention relates to networks carrying relatively heavy traffic loads, and, in particular, to a mechanism for controlling the number of active flows in such a network.

2. Description of the Related Art

Conventional approaches for network resource allocation typically rely on predetermined traffic characteristics. Network traffic can be divided into elastic (e.g., Transport-Control Protocol (TCP)) traffic and non-elastic streaming (e.g., User-Datagram Protocol (UDP)) traffic. These two types of traffic differ in their requirements from the network. Packet-level characteristics of elastic traffic are controlled by the transport protocol and its interactions with the network, whereas non-elastic flows have inherent rate characteristics that should be preserved in the network to avoid losses.

Recent measurement studies have shown that TCP continues to be the dominant traffic type on the Internet. Non-elastic traffic, which primarily uses UDP, is controlled in the network with certain rate-limiting functions to occupy only a specified fraction of the link capacity. TCP, on the other hand, is designed to dynamically adjust its rate and achieve the maximum possible throughput given the current state of the network. When the traffic in a network is elastic, if the total offered traffic in the network exceeds the capacity of a bottle-necked link in the network, then the throughput of each individual flow can become reduced to the point at which a user will abort the connection. This is because, when there is a high arrival rate of new flows from outside the network causing overload within the network, the number of flows traversing the bottle-necked link can grow unbounded. When the number of flows becomes very high, the per-flow throughput is so significantly reduced that the application or the end user may have to abort the transaction. Under such network conditions, it is desirable to control the number of concurrent flows in the network, in order to ensure a minimal service quality to flows-in-progress and to prevent extreme degradation of throughput to individual users. However, controlling the number of active flows involves the estimation of the number of currently-active flows. Direct estimation of this quantity has previously been difficult without using per-flow state information and without the need to determine flow terminations.

SUMMARY OF THE INVENTION

Problems in the prior art are addressed in accordance with the principles of the present invention by providing a scheme that (i) relies on pre-existing information about the flow, i.e., information which is already stored in a buffer at a given node, and (ii) uses very little or no state information. A lightweight probabilistic mechanism is used to estimate the number of active flows, and this estimate is used to determine the probability of admitting a new flow into the network. A scheme consistent with embodiments of the present invention, in which admission probability is inversely proportional to the number of active flows, is shown to work very well and is able to stabilize an otherwise overloaded network. By preventing the number of flows from growing unbounded, a scheme consistent with embodiments of the present invention can provide better quality of service to all flows currently in a network, without significantly impairing link utilization. A scheme consistent with embodiments of the present invention has also been shown to have good relative performance, even when (i) buffer sizes are small and (ii) the network implementing the scheme carries a mix of TCP and UDP traffic.

In one embodiment, the present invention provides a method for controlling admission of new flows at a node in a network of nodes interconnected by links. The method includes: (a) for each of a plurality of incoming packets arriving at the node, each incoming packet corresponding to an active flow traversing the node: (a1) randomly selecting a packet from an output buffer of the node; (a2) determining whether the incoming packet is from the same active flow as the randomly-selected packet; and (a3) updating an estimate of the number of active flows traversing the node based on the determination of step (a2); and (b) determining whether to admit or drop part or all of a new flow at the node based on the estimated number of active flows traversing the node.

In another embodiment, the present invention provides a network of nodes interconnected by links. The network is adapted to: (a) for each of a plurality of incoming packets arriving at a node of the network: (a1) randomly select a packet from an output buffer of the node, each packet from an active flow traversing the node; (a2) determine whether the incoming packet is from the same active flow as the randomly-selected packet; and (a3) update an estimate of the number of active flows traversing the node based on the determination of step (a2); and (b) determine whether to admit or drop part or all of a new flow at the node based on the estimated number of active flows traversing the node.

In a further embodiment, the present invention provides a node for a network of nodes interconnected by links, wherein, for each of a plurality of incoming packets arriving at the node, each packet from an active flow traversing the node, the node is adapted to: randomly select a packet from an output buffer of the node; determine whether the incoming packet is from the same active flow as the randomly-selected packet; and update an estimate of the number of active flows traversing the node based on the determination, wherein the node is enabled to determine whether to admit or drop part or all of a new flow at the node based on the estimated number of active flows traversing the node.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
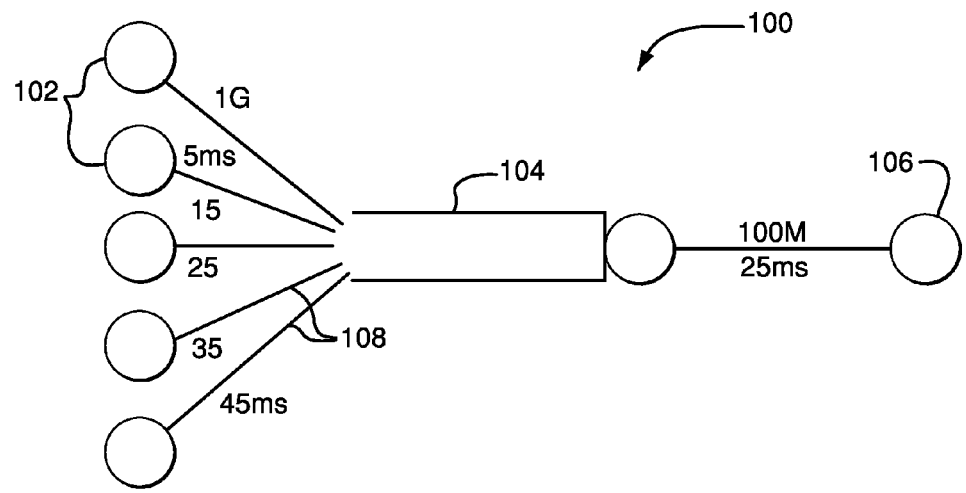
FIG. 1 illustrates an exemplary single-hop network topology having five source nodes sending traffic over a bottle-necked link to a sink node, as used in simulations of a Lightweight Bandwidth-Management (LBM) scheme consistent with embodiments of the present invention.

The present invention provides, in various embodiments, a Lightweight Bandwidth-Management (LBM) scheme that can be used to obtain both (i) an estimate of the number of active flows at a node in a network, and (ii) the probabilistic acceptance of a new flow request, which is inversely proportional to the number of active flows.

A known algorithm for estimating the number of active flows in a network is the Stabilized Random Early Detection (SRED) scheme proposed by Ott et al., "SRED: Stabilized RED," in *Proceedings of IEEE INFOCOM*, April 1999, incorporated herein by reference. The SRED scheme maintains a list of recently-seen flows and estimates the number of active flows by computing the hit probability, i.e., the probability that a newly-arriving (or "incoming") packet is part of an existing flow in that list.

In an LBM scheme consistent with certain embodiments of the present invention, the number of active flows is estimated by examining whether a newly-arriving packet at an incoming router interface is from the same flow as a randomly-selected packet from the buffer at the outgoing interface (or "output buffer") of the router. A count of such matches can then be used to estimate the number of active flows traversing that interface. In an LBM scheme consistent with certain embodiments of the present invention, no knowledge of per-flow state information is needed at the router. In fact, unlike the SRED scheme, in an LBM scheme consistent with certain embodiments of the present invention, routers do not even need to maintain a list of recently-seen flows.

In an LBM scheme consistent with certain embodiments of the present invention, a flow is typically defined by its five tuples (source address, destination address, source port, destination port and protocol). This definition, however, can be modified to meet different goals. For example, if the goal is to limit the number of users in the network, the source IP address alone could be used to define a flow. Similarly, in order to contain the load on any server, a flow could be defined based on the destination IP address.

Another use of this proposed mechanism could be to limit the number of flows for certain classes (e.g., expedited forwarding (EF) or assured forwarding (AF) classes) in a differentiated services (diffserv) network, i.e., a network that has an architecture for providing different classes of service for network traffic. In this scenario, routers maintain separate queues to segregate traffic into equivalence classes based on certain diffserv labels known as code-point markings. To limit traffic in a class, such as in one of the AF classes, the diffserv code-point marking can be included in the flow definition and compared with the code-point marking of randomly-chosen packets from the appropriate buffer for that class. The comparison result can then be used to maintain estimates of the number of active flows per class and to limit the number of flows in each class.

An LBM-enabled router consistent with certain embodiments of the invention maintains two variables that are updated for each incoming TCP packet: the hit probability (or hit frequency) p and the estimated number of flows $N_{est}$. For the $t^{th}$ incoming packet, p(t) and $N_{est}$(t) are updated using the following equations:

$$p(t)=(1-\alpha)p(t-1)+\alpha H(t) \quad (1)$$

$$N_{est}(t) = (1-\alpha)N_{est}(t-1) + \alpha \frac{B}{p(t)Q(t)}, \quad (2)$$

where the variable H(t) is equal to 1 if the incoming packet belongs to the same flow as a randomly-selected packet in the output buffer, or 0 otherwise. B is the output buffer size, and Q(t) is the output buffer occupancy (i.e., the number of packets in the buffer) at the arrival of packet t. The parameter a is a weighting parameter having a value between 0 and 1 and may be equal to, e.g., 1/B. A higher number of active flows (estimated by $N_{est}$) implies that there will be a greater number of packets in the buffer from different flows, reducing hit probability p(t). Equations (1) and (2) are similar to the equations used in the SRED scheme, with the principal difference being that, since hit probability p(t) is updated with respect to buffer occupancy Q(t), which changes with time, the weight of p(t) changes with buffer occupancy Q(t). Hits under low buffer occupancy are less likely and hence are weighted higher. In equation (2), this weighting is reflected in the scaling factor, B/Q(t).

The estimate of the number of active flows obtained, $N_{est}$, is then used to control the total number of active flows in the system.

To control the total number of active flows, $N_{est}$ is used to determine whether to admit or drop part or all of a new flow by computing a drop probability $p_d$ for every incoming TCP SYN packet (a packet sent from a client to a server to initiate a TCP connection), using the equation $$p_d = \begin{cases} 0 & \text{if } N_{est} \leq N_{min} \\ \frac{N_{est} - N_{min}}{N_{max} - N_{min}} & \text{if } N_{min} < N_{est} < N_{max} \\ 1 & \text{if } N_{max} \leq N_{est} \end{cases} \quad (3)$$

where $N_{min}$ and $N_{max}$ are LBM parameters representing lower and upper bounds, respectively, on the number of flows at the node. These upper and lower bounds represent the desired range of the number of active flows for a given network and are provided, e.g., by the network operator based on its resource constraints. Drop probability $p_d$ represents a linear acceptance probability for the new flow request, and the value of $p_d$ varies from 0 to 1, as the estimated number of active flows varies from $N_{max}$ to $N_{min}$. Techniques are already known in the art for determining, based on a drop probability, whether to admit or drop a new flow, or a portion thereof (e.g., a percentage of packets of the flow).

It can been observed that, when buffer occupancy Q(t) is relatively small, the information about hits is small, causing the estimates of p(t) and $N_{est}$ to be inaccurate. However, during low buffer occupancy, there is no incentive to deny admission to new flows. Therefore, in certain embodiments of the invention, p(t) and $N_{est}$ are updated, and flows with probability $p_d$ are admitted, only when fractional buffer occupancy Q(t)/B is greater than a given queue threshold $q_{thresh}$. As discussed below with reference to FIGS. 12, 13, and 14, it can be seen that $q_{thresh}$=0.1 is a reasonable value for this threshold. It has been observed that, even though the estimate of N is crude, the performance of the algorithm is not significantly affected, and a very stable number of resulting active flows in the system is still achieved.

The foregoing scheme can be extended to the multi-class case by maintaining p and $N_{est}$ on a per-class basis and extending the matching to include only packets belonging to the same class of service as the arriving packet. The SYN drop probabilities can then be appropriately computed on a per-class basis.

To summarize, an LBM scheme consistent with various embodiments of the invention is an extremely lightweight system having relatively minuscule memory and per-packet processing requirements. The memory requirement of such a scheme is minimal, since preferably no per-flow state information and no history of recently-seen flows are employed. Storage and maintenance of only a few variables takes place. The processing overhead of such a scheme is also low.

Figure 24:
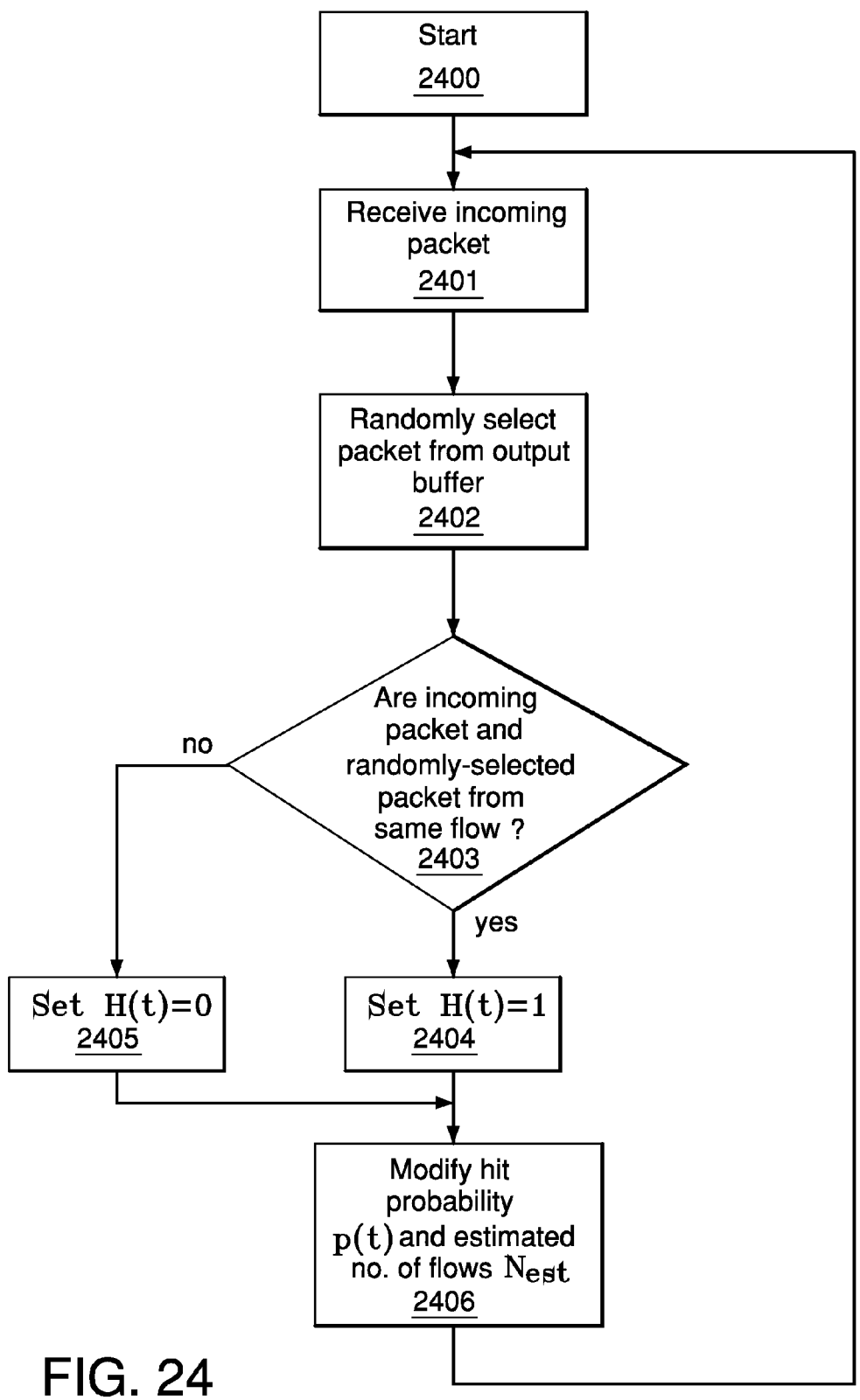
FIG. 24 is a flowchart illustrating the steps for updating the hit probability and the estimated number of flows in an LBM scheme consistent with embodiments of the present invention.

The flowchart of FIG. 24 illustrates the processing for estimating the number of currently-active flows at a node. The processing begins at step 2400. At step 2401, an incoming packet is received. At step 2402, a packet is randomly selected from the output buffer. At step 2403, a determination is made whether one or more appropriate fields of the incoming packet match corresponding fields of the randomly-selected packet to determine whether the incoming packet and the randomly-selected packet correspond to the same flow. If, at step 2403, it is determined that the incoming packet and the randomly-selected packet correspond to the same flow, then, at step 2404, the value of the variable H(t) is set equal to 1; otherwise, at step 2405, the value of the variable H(t) is set equal to 0. At step 2406, the variables p(t) and $N_{est}$ are modified according to Equations (1) and (2). The processing then returns to step 2401 to await the arrival of another incoming packet.

Figure 25:
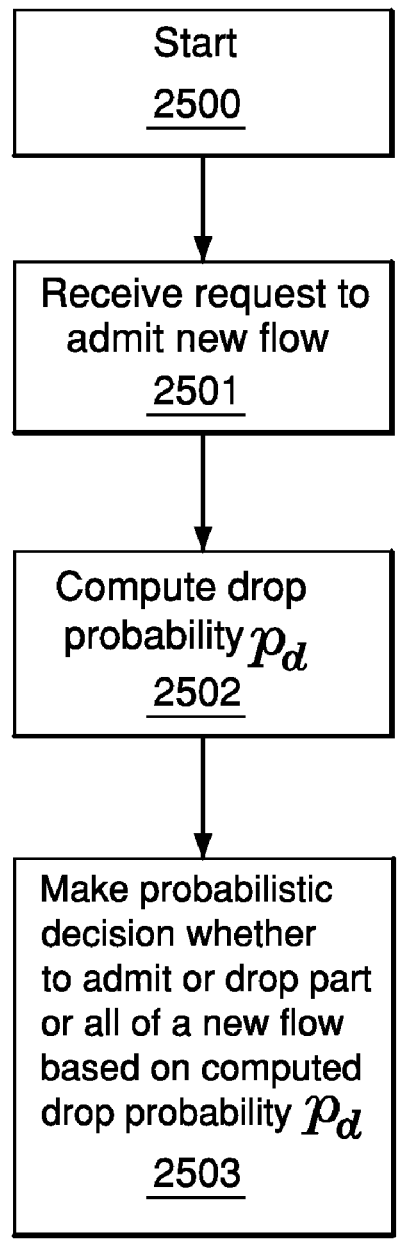
FIG. 25 is a flowchart illustrating the processing for deciding whether to admit or drop part or all of a new flow into a node.

The flowchart of FIG. 25 illustrates the processing for deciding whether to admit or drop part or all of a new flow at a node. The processing begins at step 2500. At step 2501, a request for admission of a new flow is received. At step 2502, the drop probability $p_d$ for the node is computed using Equation (3). At step 2503, a determination is made whether to admit or drop part or all of the new flow based on the computed drop probability $p_d$.

In certain embodiments of the invention, the processing of FIG. 24 is performed at one node in the network, and the processing of FIG. 25 is performed at that same node. In alternative embodiments, the processing of FIG. 24 is performed at multiple nodes in the network. In other embodiments, the processing of FIG. 25 is performed at a network server, which controls the admission of flows into the network based on the processing of FIG. 24.

The matching being performed in an LBM scheme is exact matching and is therefore mathematically less complex than longest-prefix matching or range-matching, which are performed on a per-packet basis, e.g., for IP-destination look-up, or for implementing access-control lists. Also, the random choice of packets from the buffer is performed only to avoid pathological phase effects, and it is therefore adequate to choose a packet from a fixed position, such as the front of the buffer.

Extensive simulations have been performed using an ns-2 network simulator (e.g., the simulator available on the World-Wide Web at http://www.isi.edu/nsnam/ns/) to demonstrate convincingly the effectiveness of various embodiments of an LBM scheme. In an ns-2 simulation, a TCP sender first sends a SYN packet, receives a SYN/ACK (acknowledgment) packet, and then sends the rest of the data, i.e., the SYN and the data flow are transmitted in the same direction. In reality, however, the SYN packet is sent by the client that eventually receives the data, since the majority of network traffic is download traffic, not upload traffic. Hence, a SYN or SYN/ACK packet should be dropped if it is being sent in a direction opposite to the direction in which the number of active flows at a router/gateway is being measured. In this modified-LBM scenario, the remaining aspects of an LBM scheme are implemented in ns-2 as described above.

With reference to FIG. 1, in the single-hop simulations that were performed, the principal topology of the network 100 consists of 5 source nodes 102 sending traffic over a bottle-necked link 104 to a sink node 106. Access links 108 have varying propagation delays ranging from 5 ms to 45 ms, while the delay for bottle-necked link 104 to sink node 106 is 25 msec. These delays translate into a round-trip delay time (RTT) variation of between 60 ms and 140 ms. The capacity of bottle-necked link 104 (100 Mbps or 1 Gbps) is 10 times less than that of the access links (1 Gbps or 10 Gbps). Each source generates TCP flows at the same arrival rate. For example, in order to generate an offered load of 1.2 times the bottle-necked capacity of 100 Mbps, each node generates 110 TCP flows per second. Flow sizes are obtained from a Pareto distribution with a mean flow size of 18 packets and a shape parameter of 1.8. All flows have a maximum segment size (MSS) of 1500 bytes.

Figure 2:
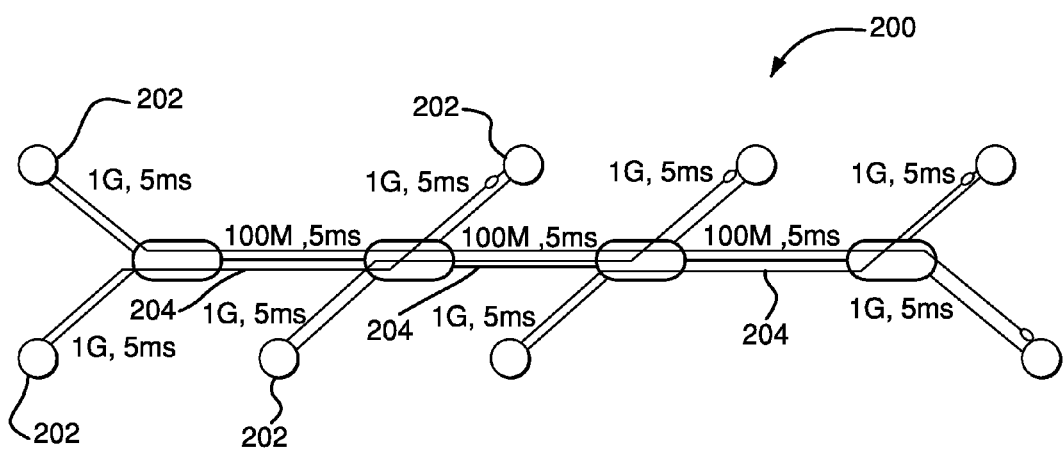
FIG. 2 illustrates an exemplary multi-hop network topology having eight source nodes sending traffic to one another over three bottle-necked links, as used in simulations of an LBM scheme consistent with embodiments of the present invention.

With reference to FIG. 2, in the multi-hop simulations that were performed, the principal topology of the network 200 consists of 8 nodes 202 sending traffic to one another over three different bottle-necked links 204. Network 200 is used to evaluate UDP cross-traffic and multiple-bottle-neck links and is designed such that all flows have the same propagation delay, irrespective of the number of bottle-necked links 204 they traverse.

For both network 100 and network 200, the performance of LBM schemes are evaluated against (i) a conventional "Drop-Tail" (or "Tail-Drop") queuing policy (i.e., when the queue is filled to its maximum capacity, the newly-arriving packets are dropped until the queue is freed to accept incoming traffic) and (ii) a RED queuing policy, e.g., as disclosed in Floyd et al., "Random Early Detection Gateways for Congestion Avoidance," IEEE/ACM Transactions on Networking, 1(4): 397-413, August 1993, the teachings of which are incorporated herein by reference.

The results for the simulations will now be presented in three parts: (i) the performance of a single-bottle-necked link scenario and the different aspects of the sharing achieved by an LBM scheme; (ii) the performance of an LBM scheme under a scenario with only two sources having widely-varying RTT values, which preserves RTT fairness as provided by TCP; and (iii) the performance of a scheme in a scenario in which flows traverse multiple links that implement LBM. For all of the following results, the following LBM parameters are used: $q_{thresh}$=0.1 $N_{min}$=100, and $N_{max}$=300. The buffer size is kept close to the bandwidth-delay product of the path (approximately 1000 packets for 100 Mbps). The offered load is at 120%. The sensitivity of an LBM scheme to these parameters will be discussed following the presentation of the simulation results.

Figure 3:
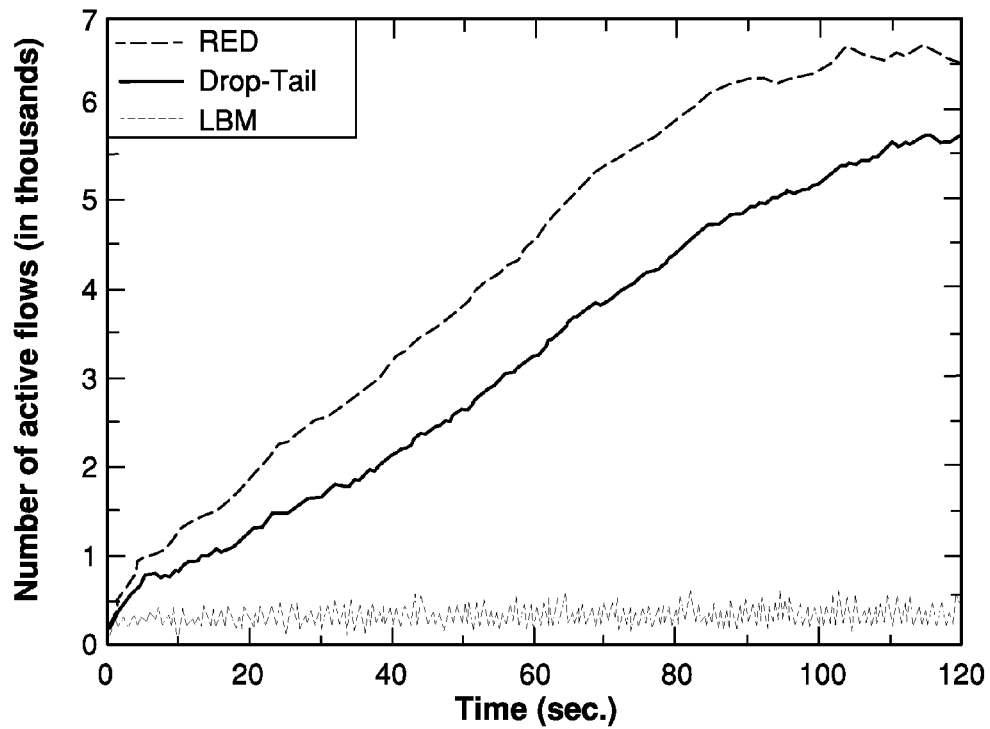
FIG. 3 illustrates the number of active flows as a function of time for different queue-management schemes in simulations of an LBM scheme consistent with embodiments of the present invention.

With reference to FIG. 3, the performance of an LBM scheme under the single-bottle-necked link case (as shown in FIG. 1) will now be discussed. In this scenario, the premise of the bandwidth-management mechanism is that, in order to obtain a minimum throughput for all elastic traffic at a bottle-necked link, the number of active flows in the system should be limited. FIG. 3 illustrates the number of active flows in the single-bottle-neck scenario (as shown in FIG. 1) as a function of time for RED, Drop-Tail, and LBM queue-management schemes. As shown, in both the RED and Drop-Tail schemes, the number of active flows grows unbounded. However, with an LBM bandwidth-management scheme, the number of active flows in the system is controlled, and its maximum value is kept at around 500 flows.

Figure 4:
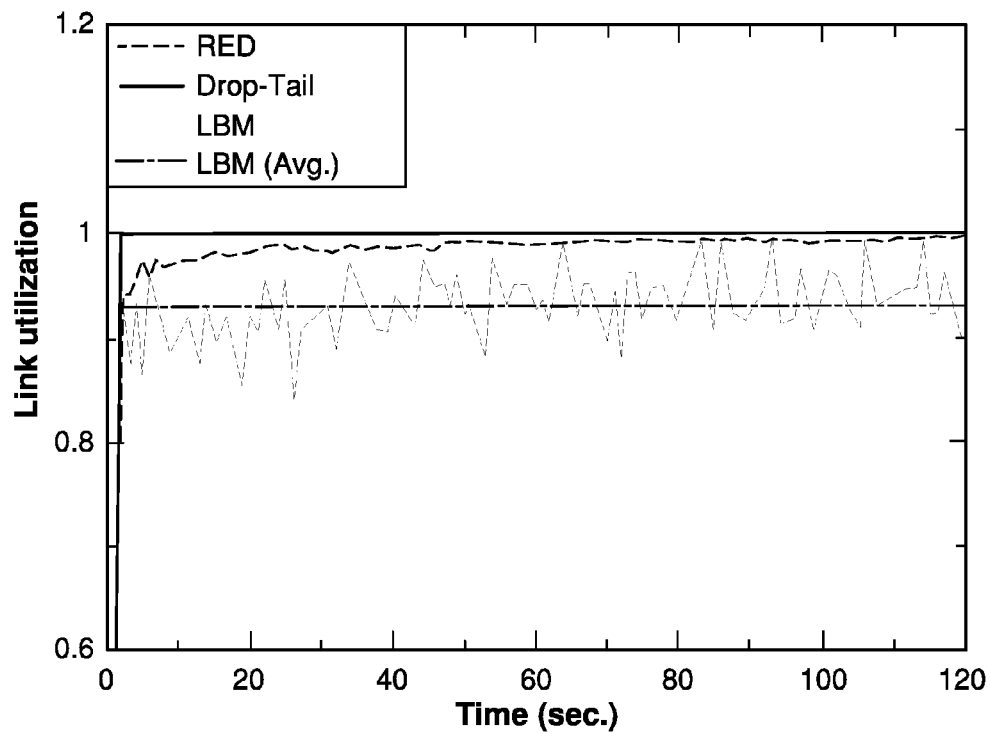
FIG. 4 illustrates link utilization of the bottle-necked link as a function of time for different queue-management schemes in simulations of an LBM scheme consistent with embodiments of the present invention.

A side effect of rejecting certain flows is that the link utilization may drop below 1. FIG. 4 illustrates the comparison of link utilization as one-second averages for RED, Drop-Tail, and LBM queue-management schemes. As shown, the average utilization is 1.0 for the Drop-Tail scheme, 0.98 for the RED scheme, and 0.93 for the exemplary LBM scheme. Even though the drop in link utilization as one-second averages occasionally becomes as large as 15%, it can be seen that the overall link utilization is still above 93%.

Figure 5:
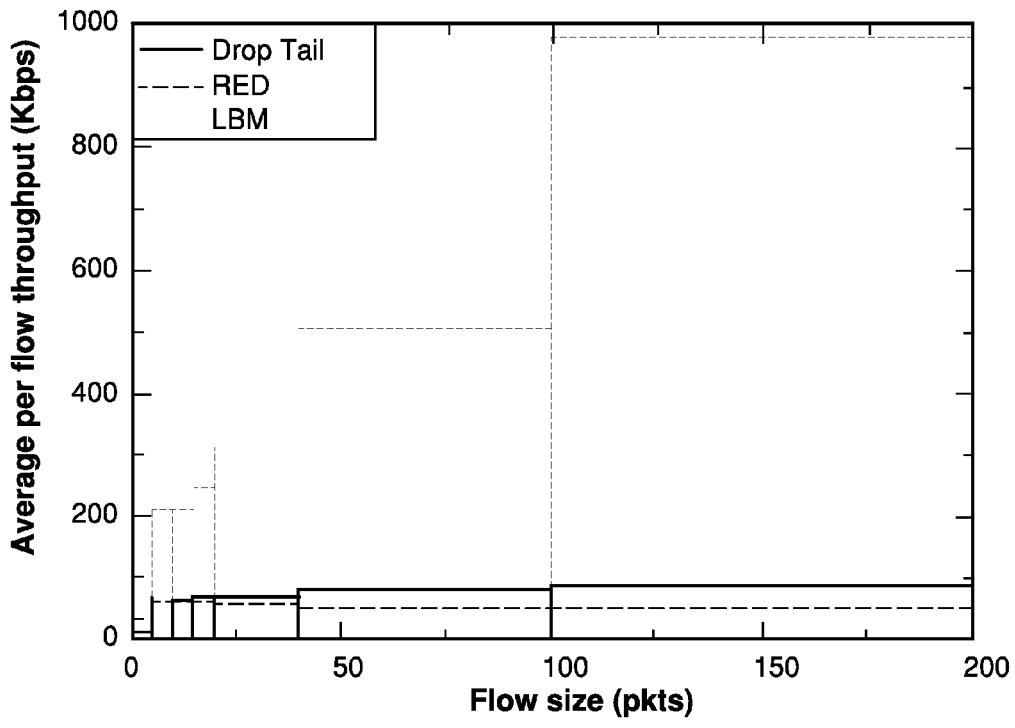
FIG. 5 illustrates average per-flow throughput as a function of flow size for different queue-management schemes in simulations of an LBM scheme consistent with embodiments of the present invention.

The primary goal of a bandwidth-management scheme is to increase the quality of service received by the admitted flows. This quality of service can be measured in terms of the throughput of those admitted flows, or alternatively, in terms of their flow completion times. The throughput or the completion time of a TCP flow is often related to its size. To illustrate this, flows can be categorized by their sizes as follows: fewer than 5 packets, 5-10 packets, 10-15 packets, 15-20 packets, 20-40 packets, 40-100 packets, and larger than 100 packets. FIG. 5 illustrates the average throughput of flows as a function of these flow sizes with Drop-Tail, RED, and LBM schemes. As shown, the exemplary LBM scheme is able to provide a proportionally fair per-flow throughput for different flow sizes, while maintaining a reasonable link utilization.

Figure 6:
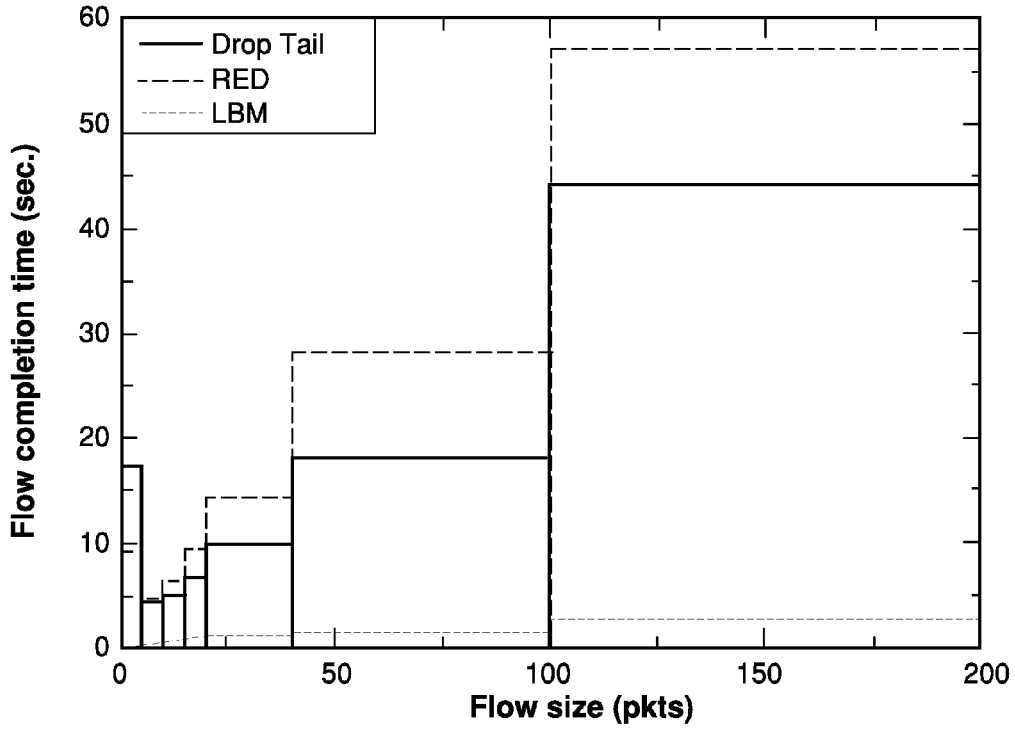
FIG. 6 illustrates average flow-completion time as a function of flow size for different queue-management schemes in simulations of an LBM scheme consistent with embodiments of the present invention.

In addition to the proportionally fair per-flow throughput of the LBM scheme illustrated in FIG. 5, the flow completion times in an LBM scheme further show proportional fairness with respect to flow sizes, as FIG. 6 illustrates. Using per-flow throughput, it is shown that the LBM scheme has a significant improvement over the Drop-Tail and RED schemes. The Drop-Tail and RED schemes provide almost identical throughput for the different flow sizes, and their throughput is also significantly lower than that obtained by LBM. As shown in FIG. 6, the flow completion time achieved by the LBM scheme is better than that of both the Drop-Tail and RED schemes. It can also be seen that the Drop-Tail and RED schemes severely affect relatively small size flows (smaller than 5 packets), since such flows end up resorting to timeout (probably many times) to recover from losses.

Figure 7:
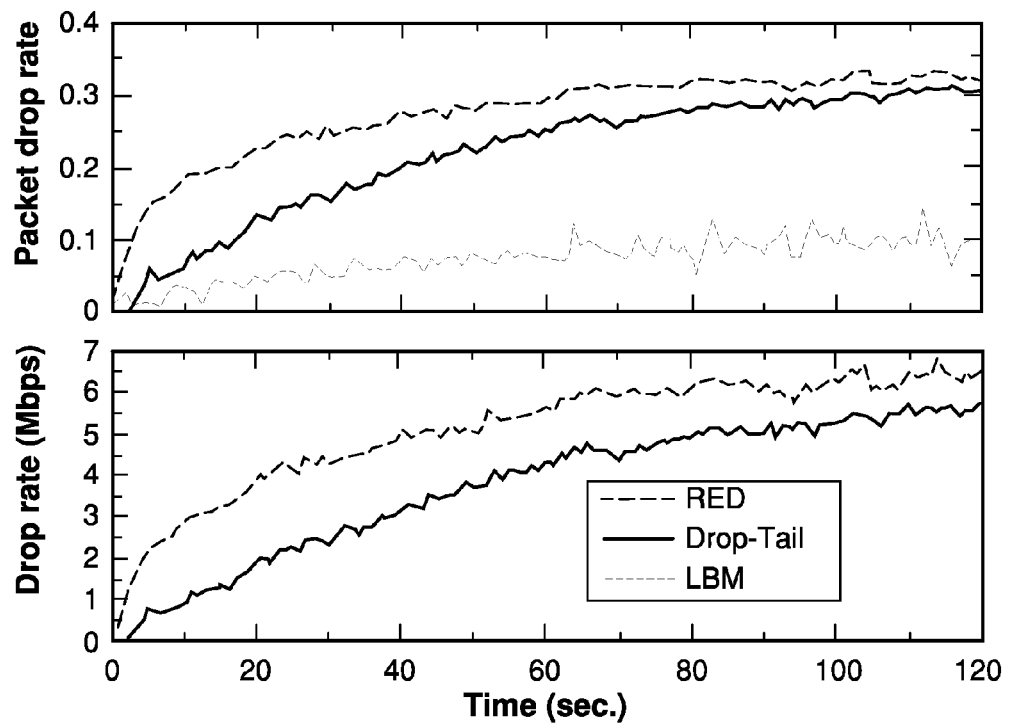
FIG. 7 illustrates packet- and data-drop rates as a function of time for different queue-management schemes in simulations of an LBM scheme consistent with embodiments of the present invention.

Despite the fact that an LBM scheme achieves a slightly lower (about 93% average) link utilization, the packet-drop rate in an LBM scheme has been observed to be kept much smaller than that in RED and Drop-Tail schemes, as FIG. 7 illustrates. As shown, this difference is further amplified when the drop rate is observed in terms of bits per second. The data drop rate is close to zero for the LBM scheme. This is because the LBM scheme drops only 40B SYN packets, while it is often the case that 1500B data packets are dropped in Drop-Tail and RED schemes.

Figure 8:
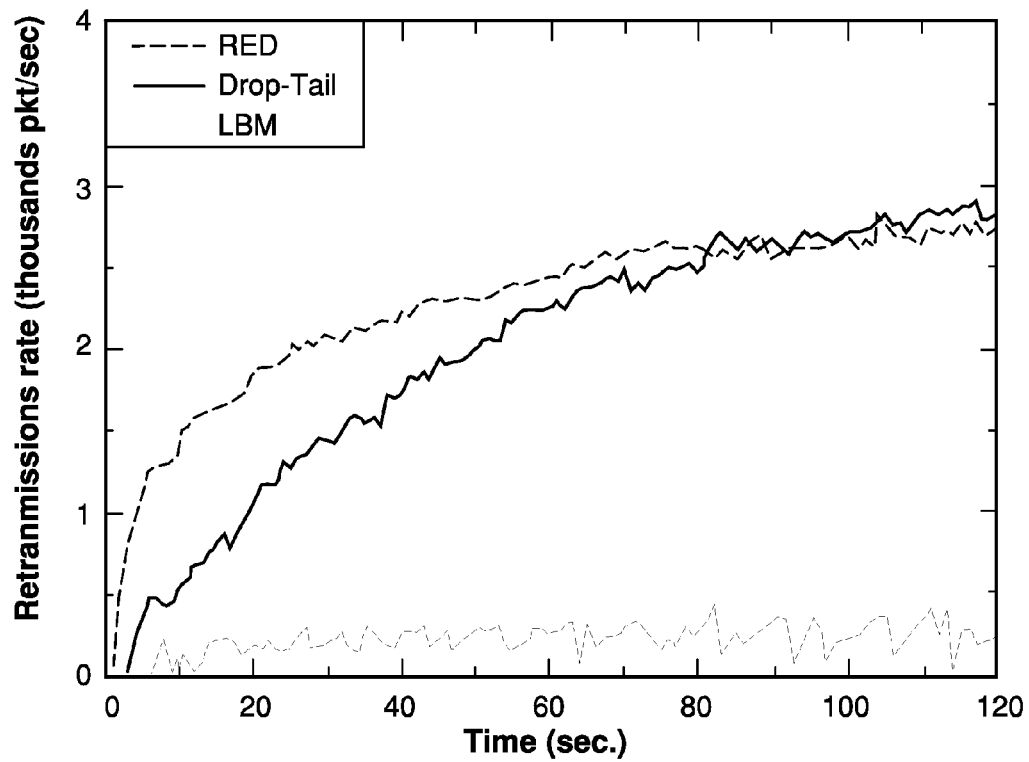
FIG. 8 illustrates data retransmission rate as a function of time for different queue-management schemes in simulations of an LBM scheme consistent with embodiments of the present invention.

The effectiveness of an LBM bandwidth-sharing scheme in terms of improving the useful throughput achieved by the existing flows on the bottle-necked links can be measured in terms of the number of retransmissions. FIG. 8 illustrates that the retransmission rates of the RED and Drop-Tail schemes are 3 times worse than that of the LBM scheme. In the LBM scheme, the packet retransmission rate is maintained at less than 500 packets per second. As with the dropped-packet case of FIG. 7, the differences between the LBM scheme and other buffer-management schemes widen when considering the rate of retransmitted bits.

Figure 9:
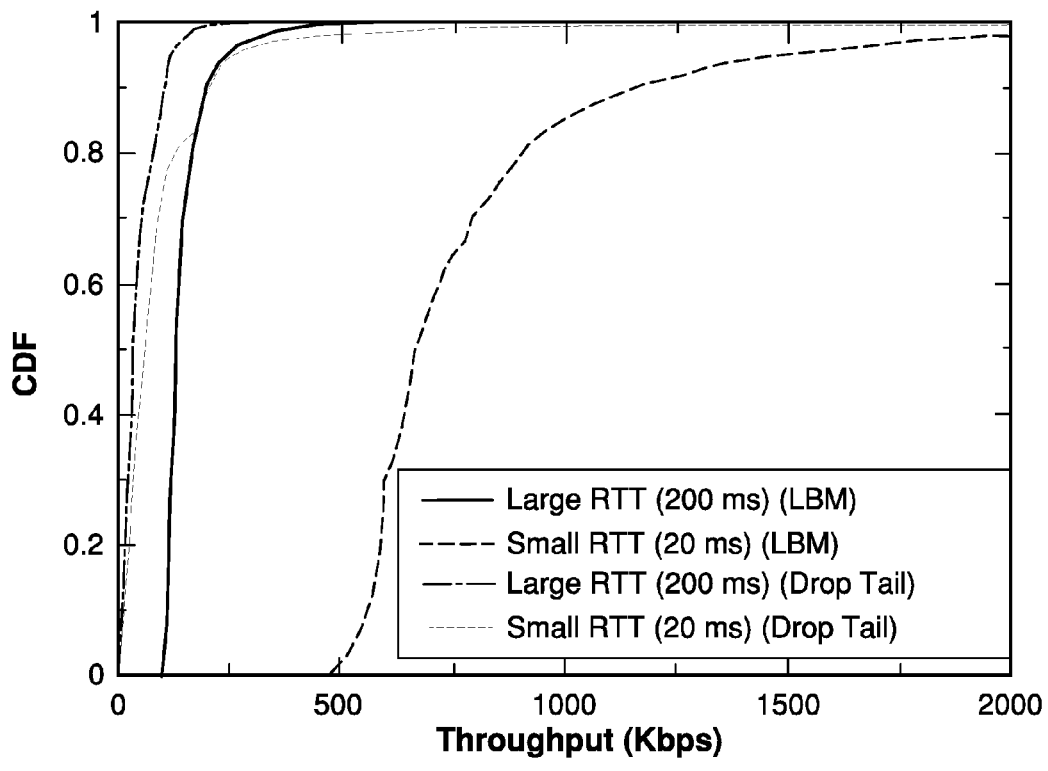
FIG. 9 illustrates the cumulative distribution function (CDF) of per-flow throughput when the difference between round-trip delay times (RTTs) of two classes of flows is large, in simulations of an LBM scheme consistent with embodiments of the present invention.

In the context of TCP, a network is considered "fair" if the allocated bandwidth to a flow is inversely proportional to its RTT. To illustrate that an LBM scheme consistent with embodiments of the present invention preserves this notion of fairness, the simulation configuration is simplified for certain simulations. In particular, the simplified simulation involves only two source nodes having very different RTTs, namely 20 and 200 msec. FIG. 9 shows the cumulative distribution function (CDF) of per-flow throughput with LBM and Drop-Tail buffer-management schemes for large and small RTT flows. It can be seen that LBM alleviates the inherent RTT unfairness in the Drop-Tail scheme towards flows with relatively small RTT. The (large-flow to small-flow) throughput ratio provided by LBM is much closer to 10, which is expected for TCP flows having a (large-flow to small-flow) RTT ratio of 10.

Figure 10:
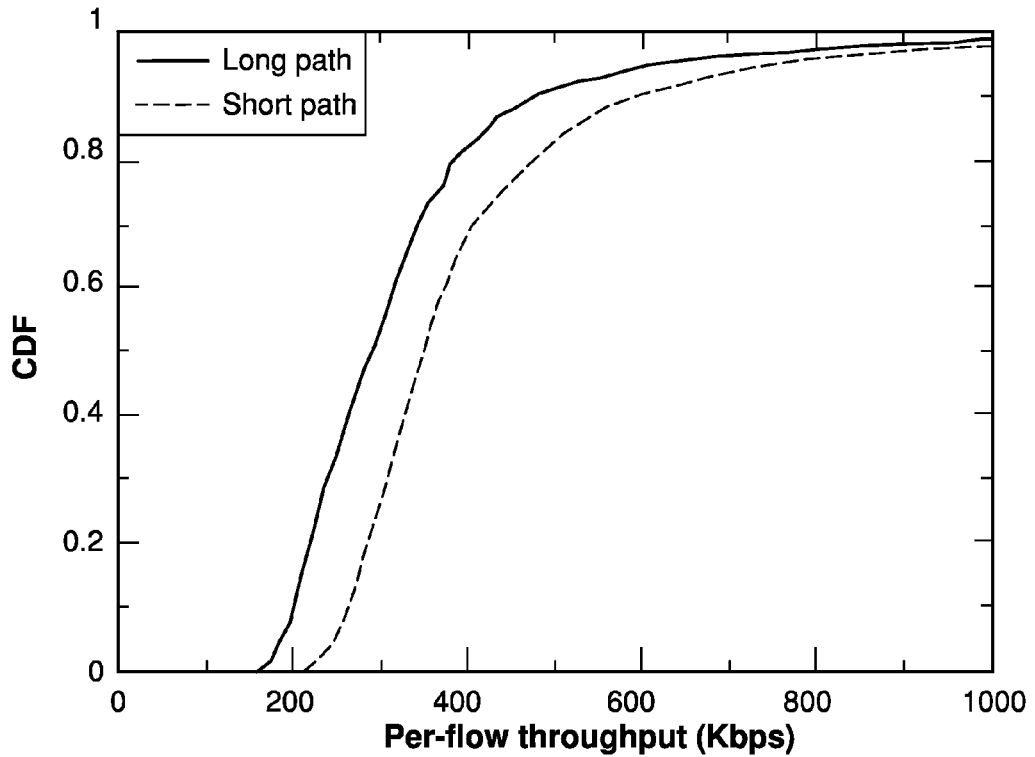
FIG. 10 illustrates the CDF of per-flow throughput of admitted flows in a multi-hop network, in simulations of an LBM scheme consistent with embodiments of the present invention.

The performance of an LBM scheme in the context of a multi-hop network will now be discussed. In the Internet, it is possible that a given TCP flow will travel multiple autonomous systems. All of these autonomous systems, in principle, can implement LBM schemes according to embodiments of the present invention and can also be congested. To examine the behavior of an LBM scheme in this scenario, the multi-hop topology of FIG. 2 is used. All flows have the same propagation delay. There are some flows that traverse all three bottle-necked links 204, all of which implement an LBM scheme consistent with embodiments of the present invention, and these flows will be referred to as "long-path flows." Other flows traversing only one of the bottle-necked links will be referred to as "short-path flows." FIG. 10 shows the CDF of per-flow throughput for admitted flows in this scenario, at the last node implementing an LBM scheme. It can be seen that flows having larger numbers of hops receive less throughput than the single-hop flows. This difference, however, is due to the difference in their respective perceived RTTs. Even though the minimum RTT for both kinds of flows is the same, the long-path flows traverse three bottle-necked links and thus experience three times the queuing delay, as compared to the queuing delay experienced by short-path flows, which traverse only one bottle-necked link. It is noted that the fraction of the long-path flows that are admitted through all of the bottle-necked links is much smaller than that of the short-path flows, since the long-path flows are subjected to denial at multiple LBM nodes.

Implementation and deployment issues related to an LBM scheme consistent with embodiments of the present invention will now be discussed. First, it will be shown that an LBM scheme is not harmful at low utilization levels. Next, the robustness of an LBM scheme to its parameters will be evaluated. It will further be shown how an LBM scheme scales with link capacity and how such a scheme performs in the presence of UDP traffic.

Figure 11:
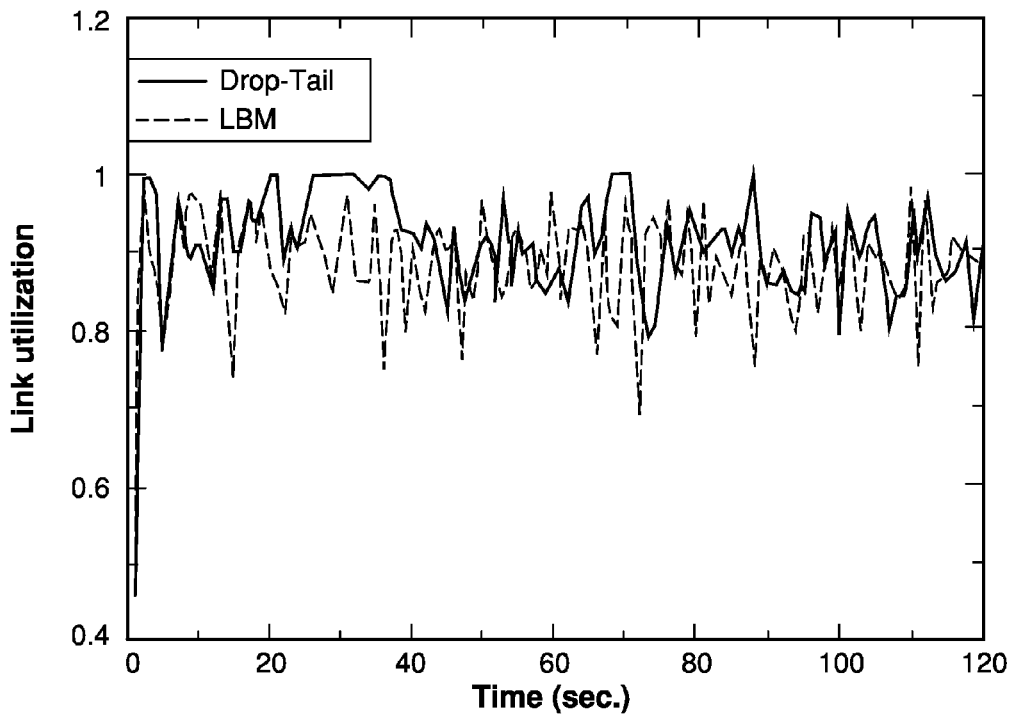
FIG. 11 illustrates link utilization with Drop-Tail and LBM schemes, when the offered load is at 95% of the link capacity, in simulations of an LBM scheme consistent with embodiments of the present invention.

The above description considers an overloaded network, in which a bandwidth-management scheme is useful. Yet, one important criterion for a good bandwidth-management scheme is that it should not adversely affect the behavior of the network under lower values of utilization. For this purpose, the performance of an LBM scheme is shown using an offered load that is high but is below the bottle-necked link capacity. FIG. 11 shows that an LBM scheme consistent with embodiments of the present invention does not reduce the link utilization significantly when the offered load is below the link capacity (95%). The average link utilization with the Drop-Tail and LBM schemes are 90% and 88%, respectively.

The sensitivity of an LBM scheme consistent with embodiments of the present invention to changes in LBM parameters will now be discussed. These three parameters are $q_{thresh}$ (queue threshold), $N_{min}$ (a lower bound on the number of flows), and $N_{max}$ (an upper bound on the number of flows). The effectiveness of an LBM scheme in which $N_{min}$ and $N_{max}$ are 100 and 300, respectively, is evaluated. The effects of $N_{min}$ and $N_{max}$ are studied by varying the range from $N_{min}$ to $N_{max}$, while keeping the mean $(N_{min}+N_{max})/2$ and $q_{thresh}$ constant.

Figure 12:
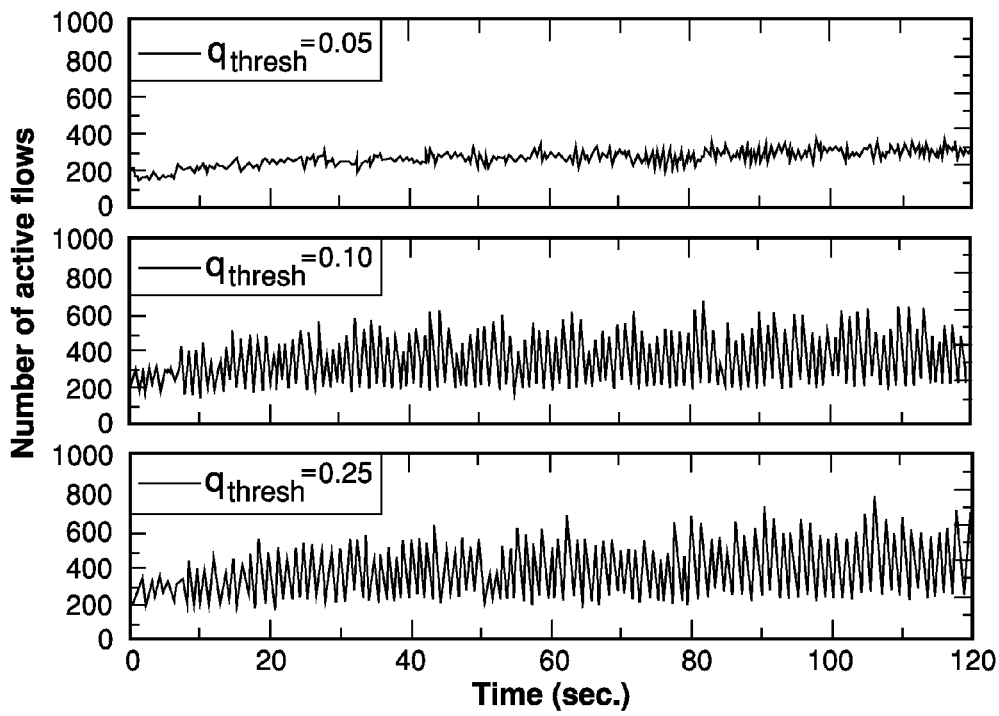
FIG. 12 illustrates the number of active flows with different queue-threshold values, in simulations of an LBM scheme consistent with embodiments of the present invention.

FIG. 12 shows the number of active flows for each of three different $q_{thresh}$ values: 0.05, 0.10, and 0.25. The buffer size in all three cases is the same (1000 packets), which is slightly larger than the bandwidth-delay product of the path. As shown, the larger the value of $q_{thresh}$, the larger the mean and the variations in the number of active flows. For $q_{thresh}=0.10$, the mean number of active flows is close to 300, while, for q=0.05, the mean number of active flows is close to 200. This can be explained by the fact that, when $q_{thresh}$ is small, there is a smaller number of packets in the buffer, and the random comparisons made with the arrival of each packet are able to better approximate the actual count of the flows in the system.

Figure 13:
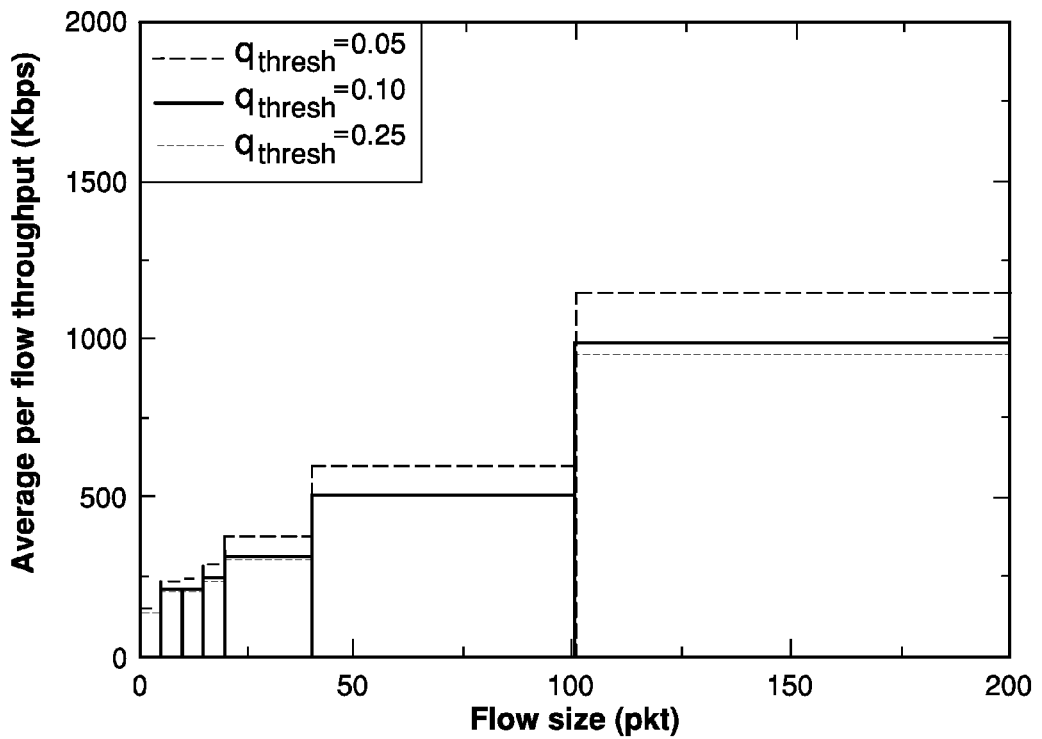
FIG. 13 illustrates per-flow throughput as a function of flow size with different queue-threshold values, in simulations of an LBM scheme consistent with embodiments of the present invention.
Figure 14:
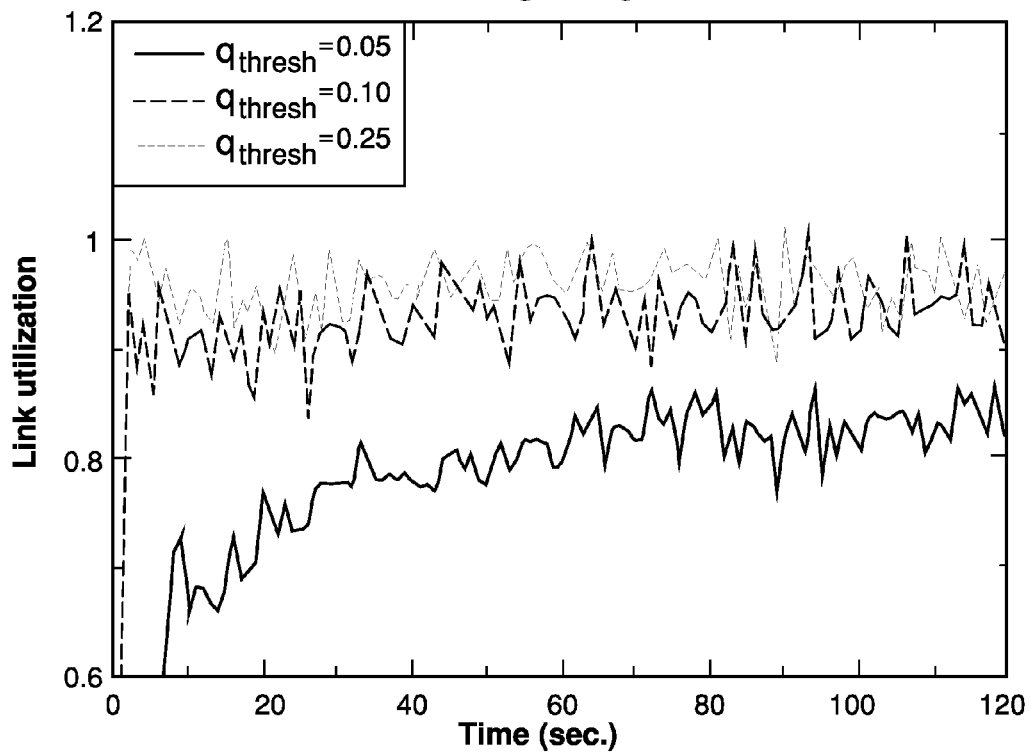
FIG. 14 illustrates per-flow throughput as a function of flow size with different queue-threshold values, in simulations of an LBM scheme consistent with embodiments of the present invention.

FIG. 13 shows per-flow throughput as a function of flow size for three different $q_{thresh}$ values. As shown, due to the smaller number of active flows, the per-flow throughput of admitted flows is larger when q=0.05. However, this increased per-flow throughput is attained at the cost of reduced link utilization, as shown in FIG. 14. For values of $q_{thresh}$ between 0.10 and 0.25, the LBM scheme provides a higher per-flow throughput while maintaining a high link utilization.

Figure 15:
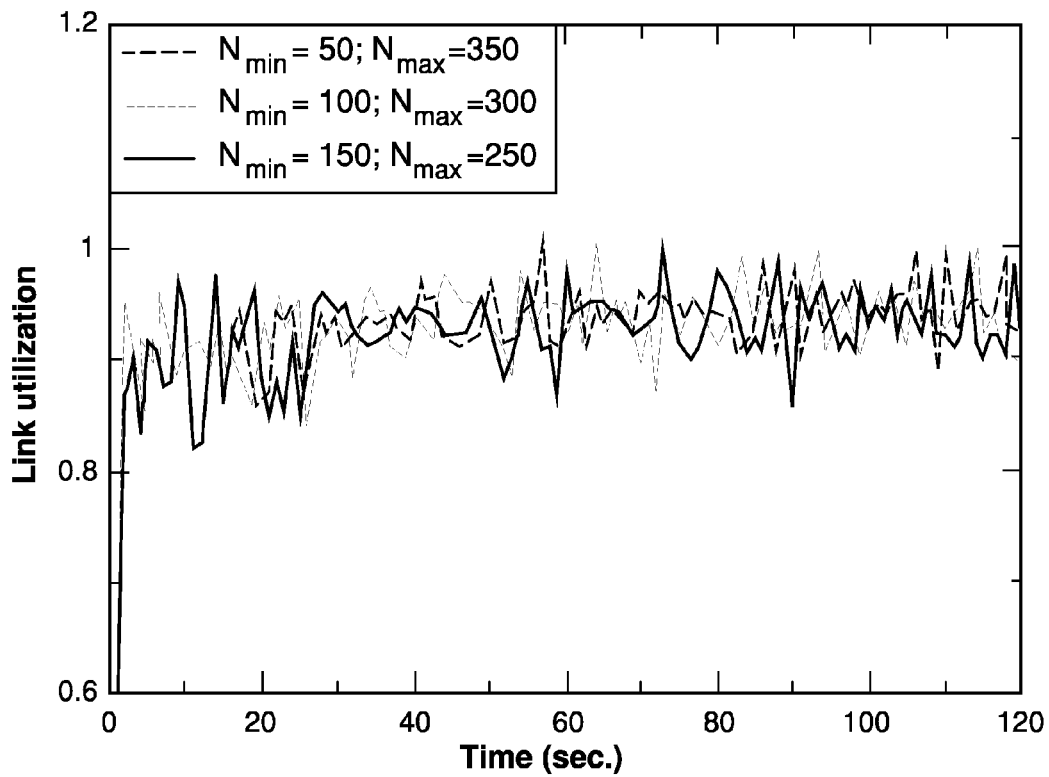
FIG. 15 illustrates per-flow throughput as a function of flow size with different lower- and upper-bounds on the number of flows, in simulations of an LBM scheme consistent with embodiments of the present invention.
Figure 16:
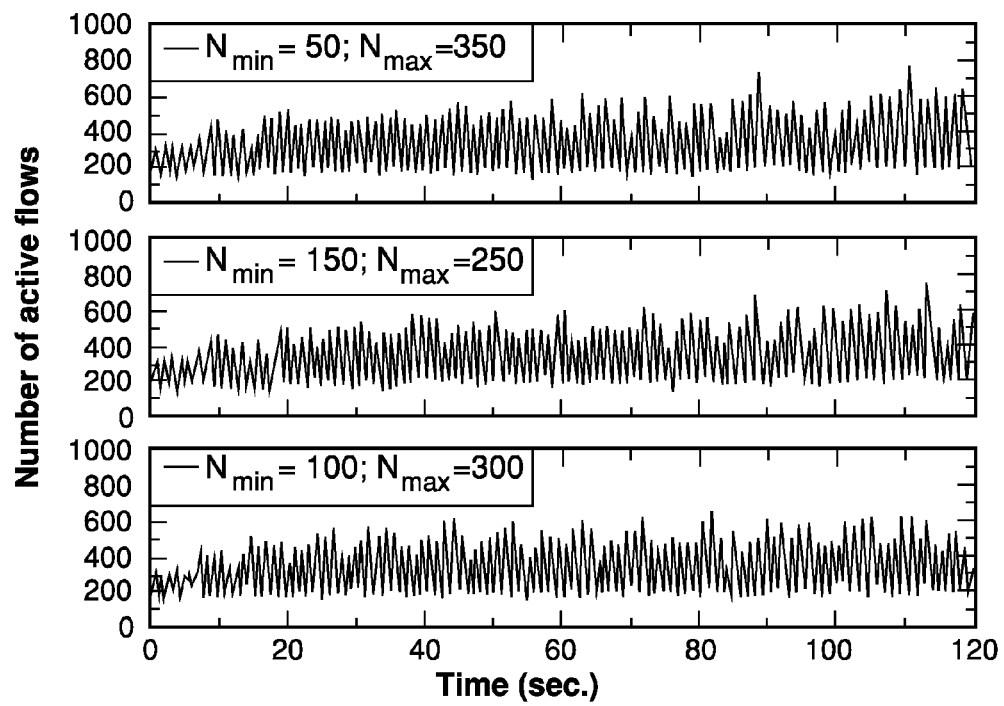
FIG. 16 illustrates the number of active flows with different lower- and upper-bounds on the number of flows, in simulations of an LBM scheme consistent with embodiments of the present invention.

The slope of the probabilistic drop function for TCP SYN (SYN/ACK) packets is $1/(N_{max}-N_{min})$. To evaluate the sensitivity of the LBM scheme to this slope parameter, the mean value of $N(N_{max}+N_{min})/2$ is kept at a constant value of 200, and the range $N_{min}$ to $N_{max}$ is varied. In these cases, the buffer size is set at 1000 packets, and $q_{thresh}$ is set to 0.10. FIGS. 15 and 16 show that the link utilization and the number of active flows are independent of the range between $N_{min}$ and $N_{max}$, and, in turn, independent of the slope parameter of the probabilistic drop function.

Figure 17:
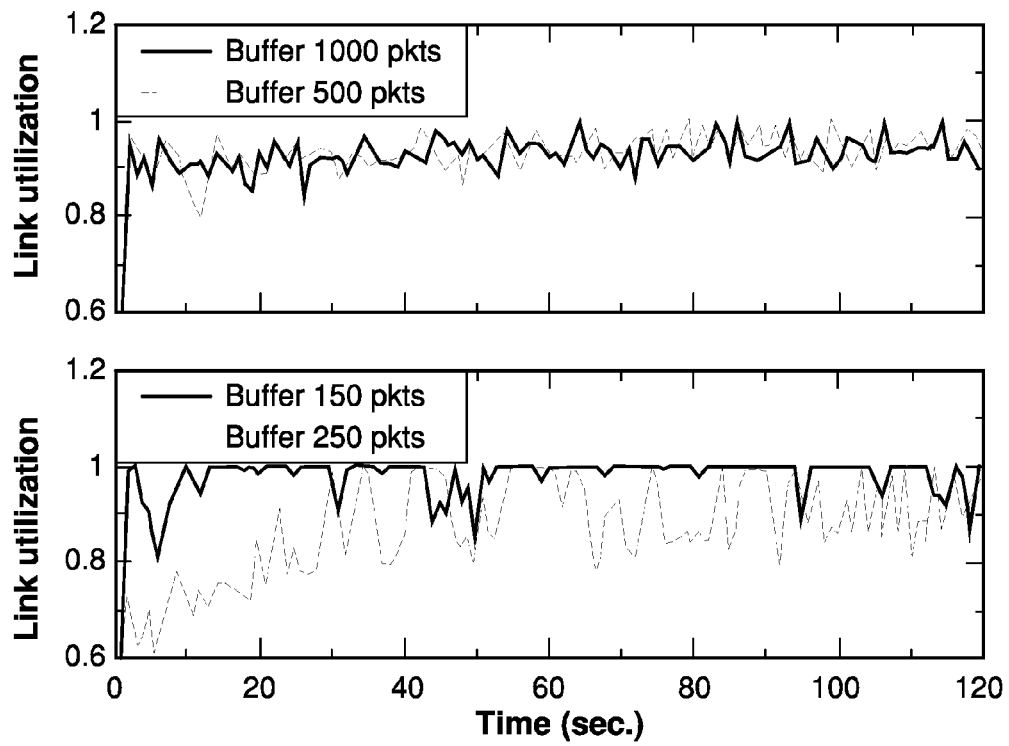
FIG. 17 illustrates link utilization with a constant queue-threshold value and different buffer sizes, in simulations of an LBM scheme consistent with embodiments of the present invention.
Figure 18:
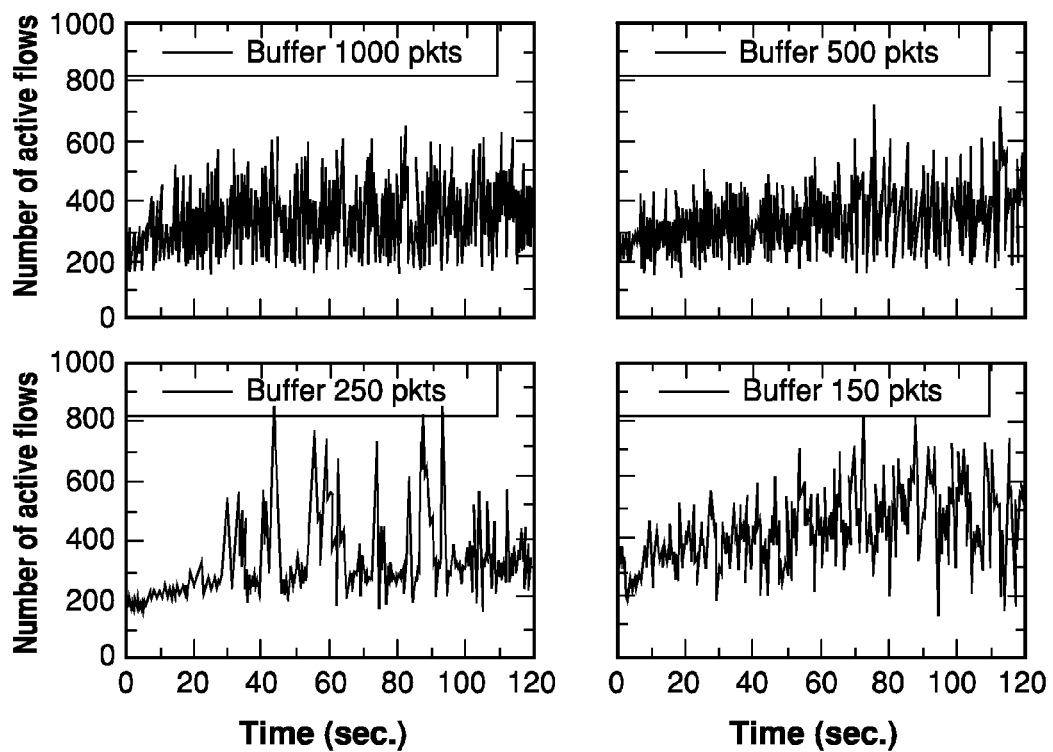
FIG. 18 illustrates the number of active flows with a constant queue-threshold value and different buffer sizes, in simulations of an LBM scheme consistent with embodiments of the present invention.
Figure 19:
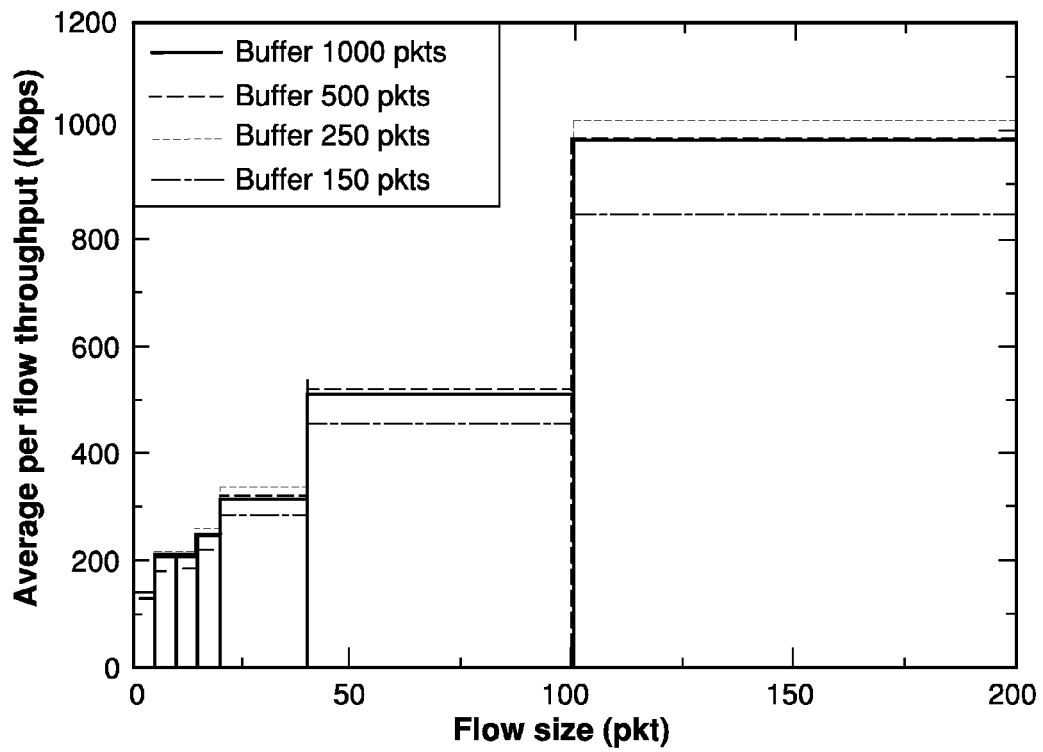
FIG. 19 illustrates per-flow throughput with a constant queue-threshold value and different buffer sizes, in simulations of an LBM scheme consistent with embodiments of the present invention.

To determine the effect of varying buffer size, simulations were performed in which $q_{thresh}=0.1$, $N_{min}=100$, and $N_{max}=300$. FIG. 17 shows the link utilization with an LBM scheme consistent with embodiments of the present invention when the buffer sizes are set to 1000, 500, 250, and 150 packets. FIGS. 18 and 19 show the number of active flows and the per-flow throughput obtained under the different buffer-size settings. The main conclusion that can be drawn from FIGS. 17-19 is that, with 1000-packet and 500-packet buffers, an LBM scheme is able to achieve effective bandwidth management. With a 250-packet buffer, an LBM scheme over-controls the number of flows, implying that the admitted flows achieve better throughput, while keeping the link under-utilized. With the 150-packet buffer, an LBM scheme under-controls the number of flows, i.e., more than the desired number of flows are admitted, such that the link utilization is high—although their per-flow throughput is smaller.

Figure 20:
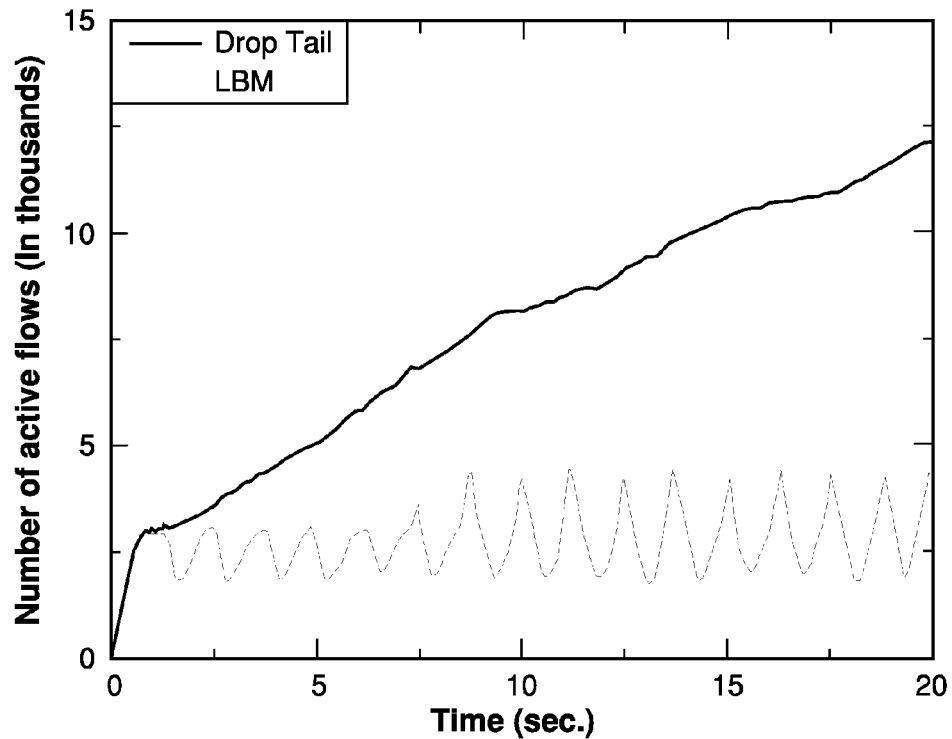
FIG. 20 illustrates the number of active flows in a gigabit network, in simulations of an LBM scheme consistent with embodiments of the present invention.
Figure 21:
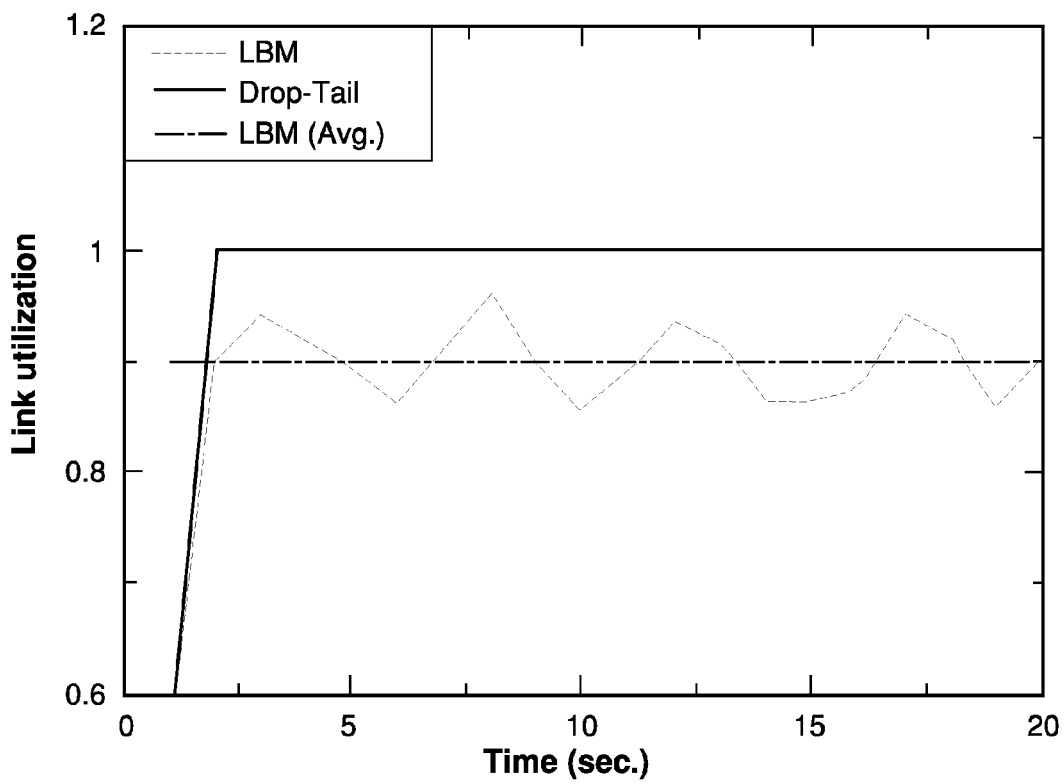
FIG. 21 illustrates link utilization in a gigabit network, in simulations of an LBM scheme consistent with embodiments of the present invention.
Figure 22:
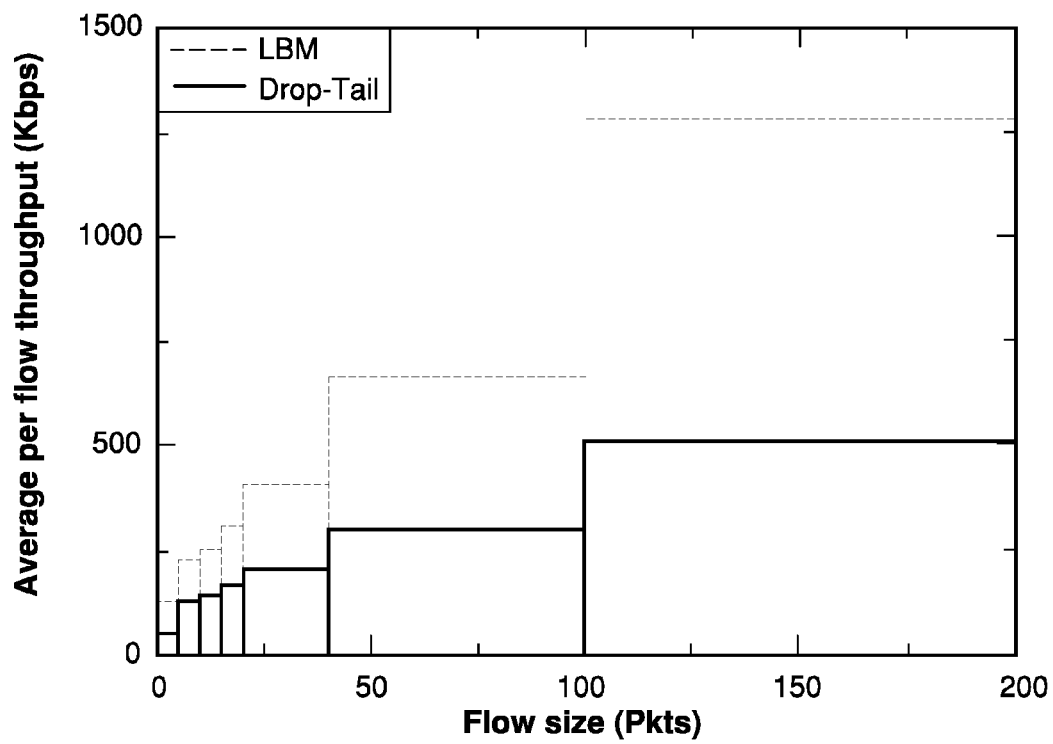
FIG. 22 illustrates per-flow throughput of admitted flows in a gigabit network, in simulations of an LBM scheme consistent with embodiments of the present invention.

A good bandwidth-management scheme should be configured to scale to higher link capacities. In all of the simulations described thus far, the capacity of the bottle-necked link was 100 Mbps. The LBM performance for a 1 Gbps bottle-necked link in a gigabit network (i.e., a network that transmits Ethernet packets at a rate of one gigabit per second, as defined by the IEEE 802.3-2005 standard) will now be evaluated. FIG. 20 shows the number of active flows in the gigabit network, FIG. 21 shows the link utilization in the gigabit network, and FIG. 22 shows per-flow throughput of admitted flows in the gigabit network. It can be seen that, as compared to the Drop-Tail scheme, an LBM scheme controls the total number of flows to a stable value of less than 5000. Thus, with a tenfold increase in capacity from 100 Mbps to 1 Gbps, there is a tenfold increase in the number of active flows, from 500 to 5000 flows. The link utilization is also maintained at around 90%. The LBM scheme maintains a significantly better per-flow throughput, as compared to the Drop-Tail scheme, as can be seen in FIG. 22.

Figure 23:
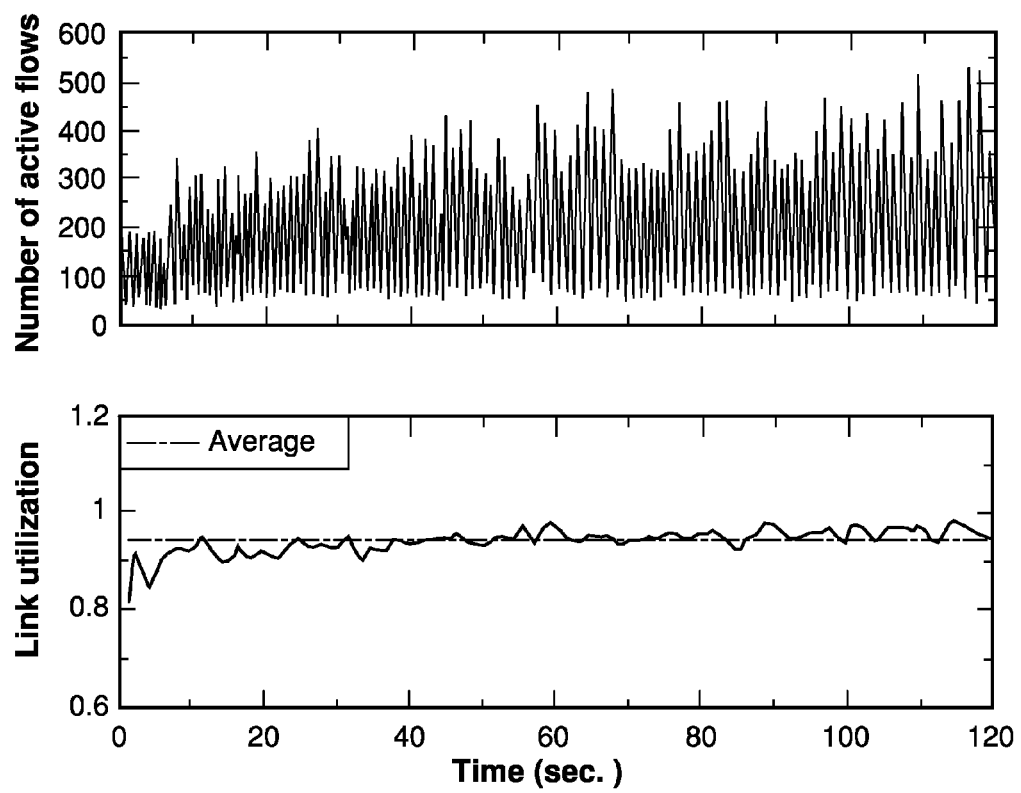
FIG. 23 illustrates the number of active flows and link utilization in the presence of 20% UDP traffic, in simulations of an LBM scheme consistent with embodiments of the present invention.

To evaluate the performance of an LBM scheme in the presence of UDP traffic, background UDP traffic is introduced at the rate of 20% of the link capacity. UDP flows are used for the long-path flows, and TCP flows are used for the short-path flows in the multi-hop topology. The bottle-necked link capacity is 100 Mbps. From FIG. 23, it can be seen that the number of active flows remains bounded, and the link utilization achieved is about 94%. In this scenario, elastic traffic from TCP can use only link bandwidth that is not being used by non-elastic UDP traffic. However, it is expected that, when the proportion of UDP traffic is significantly high, a different bandwidth-management scheme in the form of rate-control would be applied for the UDP traffic.

An LBM scheme consistent with embodiments of the present invention is extensible to the diffserv framework, avoids per-flow state information, and uses only simple exact-match operations in the data path. The low overhead makes the scheme practical and scalable to high speeds. The scheme can also be generalized to networks with multiple traffic classes. Also, by appropriate choice of flow definitions, the scheme can be used for new applications, such as controlling the number of peer-to-peer transfers currently active in a network. The scheme maintains only two variables at a router, is very effective in bounding the number of active flows that traverse a bottle-necked link, and can provide an order of magnitude improvement in per-flow throughput for different flows. By the foregoing simulations, it has been shown that an LBM scheme (i) has good per-flow performance for flows traversing different multi-hop paths, (ii) scales well to high speeds, and (iii) does not introduce additional unfairness between large and small RTT flows. It is also robust to the choice of its implementation parameters. An LBM scheme consistent with the present invention can be combined, at very little incremental cost, with other schemes, such as active queue management (AQM) schemes, to achieve even more performance gains.

The term "random" in the context of selection of a packet from the buffer of an outgoing interface at a node, as used herein, should not be construed as limited to pure random selections or number generations, but should be understood to include pseudo-random, including seed-based selections or number generations, as well as other selection or number generation methods that might simulate randomness but are not actually random, or do not even attempt to simulate randomness.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims are recited in a particular sequence with corresponding labeling, unless the claim recitations otherwise imply a particular sequence for implementing some or all of those elements, those elements are not necessarily intended to be limited to being implemented in that particular sequence.

The expressions "a Lightweight Bandwidth-Management scheme," "an LBM scheme," "the Lightweight Bandwidth-Management scheme," and "the LBM scheme" should be understood not to refer necessarily to any single embodiment of the invention and should be interpreted broadly, as referring to any one of a number of possible embodiments of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method for controlling admission of new flows at a node in a network of nodes interconnected by links, the method comprising:

(a) for each of a plurality of incoming packets arriving at the node, each incoming packet corresponding to an active flow traversing the node:

(a1) randomly selecting a packet from an output buffer of the node;

(a2) determining whether the incoming packet is from the same active flow as the randomly-selected packet; and (a3) updating an estimate of the number of active flows traversing the node based on the determination of step (a2); and
(b) determining whether to admit or drop part or all of a new flow at the node based on the estimated number of active flows traversing the node, wherein step (b) comprises:
(b1) calculating a drop probability $p_d$ using the equation $$p_d = \frac{N_{est} - N_{min}}{N_{max} - N_{min}},$$

wherein:
$N_{est}$ represents the estimated number of active flows at the node; and
$N_{min}$ and $N_{max}$ represent lower and upper bounds, respectively, on the number of flows at the node; and
(b2) determining whether to admit or drop part or all of the new flow at the node based on the drop probability $p_d$.

2. The method of claim 1, wherein:
the new flow is admitted at the node only if a fractional buffer occupancy Q(t)/B exceeds a specified queue threshold $q_{thresh}$; B represents size of a buffer of the node; and Q(t) represents the number of packets in the buffer.

3. The method of claim 1, wherein step (a2) comprises determining whether one or more fields of the incoming packet match one or more corresponding fields of the randomly-selected packet.

4. The method of claim 1, wherein steps (a) and (b) are performed without using per-flow state information and without using a list of recently-seen flows.

5. The method of claim 1, wherein:
the node provides two or more classes of service for network traffic;
steps (a1)-(a3) are performed for a plurality of packets of a specific class of service to estimate a number of flows of the specific class of service traversing the node; and
step (b) determines whether to admit or drop part or all of a new flow of the specific class of service using the estimated number of flows of the specific class of service traversing the node.

6. The method of claim 1, wherein step (a3) comprises:
(a3i) updating a hit probability based on the determination of step (a2); and
(a3ii) updating the estimated number of active flows traversing the node based on the hit probability.

7. A method for controlling admission of new flows at a node in a network of nodes interconnected by links, the method comprising:
(a) for each of a plurality of incoming packets arriving at the node, each incoming packet corresponding to an active flow traversing the node:
(a1) randomly selecting a packet from an output buffer of the node;
(a2) determining whether the incoming packet is from the same active flow as the randomly-selected packet; and
(a3) updating an estimate of the number of active flows traversing the node based on the determination of step (a2); and (b) determining whether to admit or drop part or all of a new flow at the node based on the estimated number of active flows traversing the node, wherein:
step (a3) comprises:
(a3i) updating a hit probability based on the determination of step (a2); and
(a3ii) updating the estimated number of active flows traversing the node based on the hit probability;
the hit probability p(t) is updated using the equation $$p(t) = (1-\alpha)p(t-1) + \alpha H(t);$$

H(t) is set equal to 1 if the incoming packet belongs to the same flow as the randomly-selected packet, and 0 otherwise; and $\alpha$ is a weighting parameter.

8. A method for controlling admission of new flows at a node in a network of nodes interconnected by links, the method comprising:
(a) for each of a plurality of incoming packets arriving at the node, each incoming packet corresponding to an active flow traversing the node:
(a1) randomly selecting a packet from an output buffer of the node;
(a2) determining whether the incoming packet is from the same active flow as the randomly-selected packet; and
(a3) updating an estimate of the number of active flows traversing the node based on the determination of step (a2); and
(b) determining whether to admit or drop part or all of a new flow at the node based on the estimated number of active flows traversing the node, wherein:
step (a3) comprises:
(a3i) updating a hit probability based on the determination of step (a2); and
(a3ii) updating the estimated number of active flows traversing the node based on the hit probability;
the estimated number of active flows $N_{est}(t)$ is updated using the equation $$N_{est}(t) = (1-\alpha)N_{est}(t-1) + \alpha \frac{B}{p(t)Q(t)};$$

$\alpha$ is a weighting parameter; p(t) is the hit probability; B represents the buffer size of a buffer of the node; and Q(t) represents the number of packets in the buffer.

9. A method for controlling admission of new flows at a node in a network of nodes interconnected by links, the method comprising:
(a) for each of a plurality of incoming packets arriving at the node, each incoming packet corresponding to an active flow traversing the node:
(a1) randomly selecting a packet from an output buffer of the node;
(a2) determining whether the incoming packet is from the same active flow as the randomly-selected packet; and
(a3) updating an estimate of the number of active flows traversing the node based on the determination of step (a2); and
(b) determining whether to admit or drop part or all of a new flow at the node based on the estimated number of active flows traversing the node, wherein:
step (a3) comprises:
(a3i) updating a hit probability based on the determination of step (a2); and
(a3ii) updating the estimated number of active flows traversing the node based on the hit probability; and
step (a3i) comprises:
comparing a fractional buffer occupancy Q(t)/B to a specified queue threshold $q_{thresh}$, wherein B represents the buffer size of a buffer of the node, and Q(t) represents the number of packets in the buffer; and updating the hit probability based on the comparison.

10. A system comprising:
a network of nodes interconnected by links, the network configured to:
(a) for each of a plurality of incoming packets arriving at a node of the network:
(a1) randomly select a packet from an output buffer of the node, each packet from an active flow traversing the node;
(a2) determine whether the incoming packet is from the same active flow as the randomly-selected packet; and
(a3) update an estimate of the number of active flows traversing the node based on the determination of step (a2); and (b) determine whether to admit or drop part or all of a new flow at the node based on the estimated number of active flows traversing the node, wherein step (b) comprises:

(b1) calculating a drop probability $p_d$ using the equation $$p_d = \frac{N_{est} - N_{min}}{N_{max} - N_{min}},$$

wherein:

$N_{est}$ represents the estimated number of active flows at the node; and $N_{min}$ and $N_{max}$ represent lower and upper bounds, respectively, on the number of flows at the node; and (b2) determining whether to admit or drop part or all of the new flow at the node based on the drop probability $p_d$.

11. The system of claim 10, wherein step (a) is implemented at the node, and step (b) is implemented at a network controller of the network.

12. An apparatus comprising:

a node for a network of nodes interconnected by links, wherein, for each of a plurality of incoming packets arriving at the node, each packet from an active flow traversing the node, wherein:

the node is configured to randomly select a packet from an output buffer of the node;

the node is configured to determine whether the incoming packet is from the same active flow as the randomly-selected packet; and the node is configured to update an estimate of the number of active flows traversing the node based on the determination, wherein the node is enabled to determine whether to admit or drop part or all of a new flow at the node based on the estimated number of active flows traversing the node, wherein the step of updating comprises: the node calculating a drop probability $p_d$ using the equation $$p_d = \frac{N_{est} - N_{min}}{N_{max} - N_{min}},$$

wherein:

$N_{est}$ represents the estimated number of active flows at the node; and $N_{min}$ and $N_{max}$ represent lower and upper bounds, respectively, on the number of flows at the node; and the node determining whether to admit or drop part or all of the new flow at the node based on the drop probability $p_d$.

13. The apparatus of claim 12, wherein:

the new flow is admitted at the node only if a fractional buffer occupancy Q(t)/B exceeds a specified queue threshold $q_{thresh}$; B represents size of a buffer of the node; and Q(t) represents the number of packets in the buffer.

14. The apparatus of claim 12, wherein the node determining whether the incoming packet is from the same active flow as the randomly-selected packet comprises the node determining whether one or more fields of the incoming packet match one or more corresponding fields of the randomly-selected packet.

15. The apparatus of claim 12, wherein:

the node provides two or more classes of service for network traffic;

the steps of (i) randomly selecting a packet from an output buffer of the node, (ii) determining whether the incoming packet is from the same active flow as the randomly-selected packet, and (iii) updating an estimate of the number of active flows traversing the node based on the determination are performed for a plurality of packets of a specific class of service to estimate a number of flows of the specific class of service traversing the node; and wherein the node is enabled to determine whether to admit or drop part or all of a new flow at the node by determining whether to admit or drop part or all of a new flow of the specific class of service using the estimated number of flows of the specific class of service traversing the node.

16. The apparatus of claim 12, wherein updating an estimate of the number of active flows traversing the node comprises: updating a hit probability based on the determination of whether the incoming packet is from the same active flow as the randomly-selected packet; and updating the estimated number of active flows traversing the node based on the hit probability.

* * * * *